(12) United States Patent
Chen et al.

(10) Patent No.: US 11,713,864 B2
(45) Date of Patent: *Aug. 1, 2023

(54) LIGHT SOURCE SYSTEM

(71) Applicant: Appotronics Corporation Limited, Shenzhen (CN)

(72) Inventors: Yu-San Chen, Shenzhen (CN); Qian Li, Shenzhen (CN); Yan-Zheng Xu, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,036

(22) Filed: Nov. 10, 2022

(65) Prior Publication Data

US 2023/0131292 A1    Apr. 27, 2023

Related U.S. Application Data

(63) Continuation of application No. 17/050,363, filed as application No. PCT/CN2019/070540 on Jan. 5, 2019, now Pat. No. 11,525,555.

(30) Foreign Application Priority Data

Apr. 24, 2018  (CN) .......................... 201810372907.9

(51) Int. Cl.
  *F21V 9/45*      (2018.01)
  *F21V 29/70*     (2015.01)

(52) U.S. Cl.
  CPC ................. *F21V 9/45* (2018.02); *F21V 29/70* (2015.01)

(58) Field of Classification Search
  CPC ...... F21V 1/17; F21V 3/08; F21V 3/12; F21V 5/10; F21V 7/22; F21V 7/24; F21V 7/26; F21V 7/28; F21V 7/30; F21V 9/00; F21V 9/08; F21V 9/30; F21V 9/32; F21V 9/38; F21V 9/40; F21V 9/45; F21V 13/08; F21V 13/14; F21V 29/70
  See application file for complete search history.

(56) References Cited

U.S. PATENT DOCUMENTS 9,946,143 B1    4/2018  Akiyama
2017/0293211 A1  10/2017 Kobayashi et al.
(Continued)

FOREIGN PATENT DOCUMENTS

| CN | 106154713 | 11/2016 |
|----|-----------|---------|
| CN | 107315312 | 11/2017 |
| CN | 206671744 | 11/2017 |

(Continued)

*Primary Examiner* — Jason M Han
(74) *Attorney, Agent, or Firm* — ScienBiziP, P.C.

(57) ABSTRACT

A light source system, comprising: a wavelength conversion layer (102, 202) used for receiving exciting light (L3) and generating excited light (L2); a transparent thermal conduction substrate (104, 204) used for supporting the wavelength conversion layer (102, 202), and an excitation light source which emits the exciting light (L3) from a side of the wavelength conversion layer (102, 202) to the wavelength conversion layer (102, 202); and a red light source which emits red light (L1) from a side of the transparent thermal conduction substrate (104, 204) to the wavelength conversion layer (102, 202). The light source system can effectively solve the problem of insufficient red light in fluorescent powder excitation technology.

17 Claims, 3 Drawing Sheets

(56) References Cited

U.S. PATENT DOCUMENTS

2018/0108814 A1  4/2018  Zheng et al.
2018/0129123 A1  5/2018  Guo et al.

FOREIGN PATENT DOCUMENTS

| CN | 206819041 | 12/2017 |
| CN | 207216256 | 4/2018 |
| CN | 108121140 | 6/2018 |
| JP | 2015-22255 A | 2/2015 |
| JP | 2017-201634 A | 11/2017 |
| JP | 2018-53227 A | 4/2018 |
| WO | 2018/025351 A1 | 2/2018 |

LIGHT SOURCE SYSTEM

TECHNICAL FIELD

The present disclosure relates to a light source system.

BACKGROUND

In current technical field of laser light sources, technology of irradiating fluorescent materials with excitation light to emit excited light has become a mature laser light source technology and is applied in various laser light source products. In the laser light source technology, laser light emitted by an excitation light source is collected and focused on a rotating plate having a surface containing a fluorescent material, to excite the fluorescent material to emit light.

A wavelength conversion device is one of core components of the laser light source technology, and its main form is a phosphor color wheel. However, due to limitations of characteristics of the wavelength conversion material used in the wavelength conversion device, although there are attempts to use laser light to excite the wavelength conversion material to convert so as to obtain long-wavelength light (e.g., red light with a wavelength of 585 to 680 nm), there is no such light source that can be applied to a light source technology for exciting the wavelength conversion material with high power and high power density. The main reason lies in that the current wavelength conversion materials (i.e., red phosphors) used to convert excitation light into long-wavelength light have low wavelength conversion efficiency. During a light conversion process, most of energy is converted into heat, resulting in a further decrease in luminous efficiency. This characteristic is particularly serious in high-power light sources. Therefore, in high-power laser light sources, the current technology for exciting a wavelength conversion material has a problem of insufficient red light.

SUMMARY

Based on the above, the present disclosure provides a laser light source system combining red light with a wavelength conversion device including a wavelength conversion layer with YAG: $Ce^{3+}$ as a main material. The laser light source system further includes an excitation light source to form a mixed light source. The laser light source system of the present disclosure can effectively solve the problem of insufficient red light in technology for exciting a phosphor in prior arts.

Specifically, the present disclosure provides a light source system, which comprises: a wavelength conversion layer configured to receive excitation light and generate excited light; a transparent thermal conduction substrate configured to support the wavelength conversion layer; an excitation light source configured to emit the excitation light from a side of the wavelength conversion layer toward the wavelength conversion layer; and a red light source configured to emit red light from a side of the transparent thermal conduction substrate toward the wavelength conversion layer.

The laser light source system of the present disclosure uses a red light source in addition to the excitation light source, and uses a wavelength conversion device including a wavelength conversion layer with YAG: $Ce^{3+}$ as a main material, so that the problem of insufficient red light in prior arts can be resolved.

DETAILED DESCRIPTION

Figure 1:
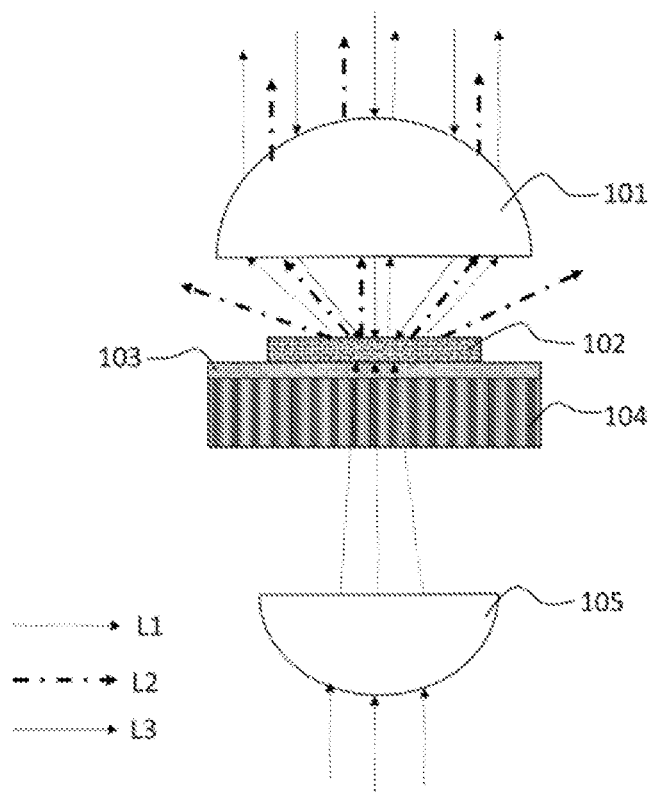
FIG. 1 is a schematic view showing a laser light source system according to a first embodiment of the present disclosure.

Next, various specific embodiments according to the present disclosure will be described in detail with reference to the accompanying drawings. It should be emphasized that all dimensions in the drawings are only schematic and not necessarily in accordance with the true scale, so they are not limited.

FIG. 1 is a schematic view showing a laser light source system according to a first embodiment of the present disclosure. As shown in FIG. 1, the laser light source system of the present disclosure includes a wavelength conversion device, an optical path adjustment component and a laser light source (not shown). Each of the wavelength conversion device, the optical path adjustment component and the laser light source will be described in detail below:

<Wavelength Conversion Device>

As shown in FIG. 1, the wavelength conversion device includes a wavelength conversion layer 102, an angle selection filter film 103, and a substrate 104 that are sequentially stacked from top to bottom.

First, in FIG. 1, L1 represents red light, L2 represents light emitted by the wavelength conversion device, and L3 represents excitation light which is blue excitation light in this embodiment.

Wavelength Conversion Layer 102

The wavelength conversion layer 102 includes a wavelength conversion material and is configured to receive the excitation light L3. In this embodiment, blue laser light is used as the excitation light. However, it will be understood by those of ordinary skill in the art that the excitation light may not be limited to the blue laser light. The excitation light irradiates the wavelength conversion layer 102, so that the wavelength conversion material is excited to emit excited light L2.

The wavelength conversion layer 102 can be formed of one of the following layers: a material layer formed by curing silica gel mixed with YAG: $Ce^{3+}$ phosphor; a fluorescent glass layer formed of YAG: $Ce^{3+}$ phosphor and glass; a pure phase ceramic layer of YAG: $Ce^{3+}$; and a multiphase ceramic layer formed by sintering YAG: $Ce^{3+}$ mixed with alumina material. The YAG: $Ce^{3+}$ material in the above layers is mainly used as a wavelength conversion material.

Figure 3:
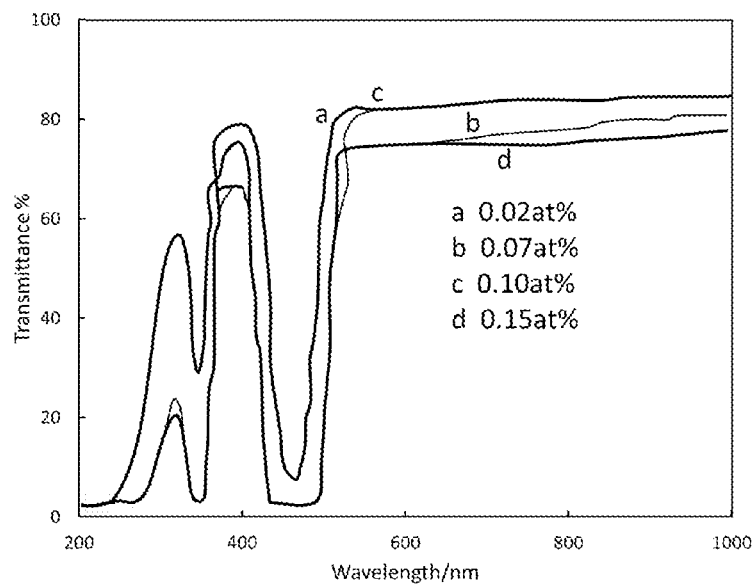
FIG. 3 shows transmission spectrums of samples with different $Ce^{3+}$ doping concentrations in prior arts.

FIG. 3 shows transmission spectrums of samples with different $Ce^{3+}$ doping concentrations and a thickness of 4.37 mm. Curve a represents a doping concentration of 0.02 at % $Ce^{3+}$, curve b represents a doping concentration of 0.07 at %

$Ce^{3+}$, curve c represents a doping concentration of 0.1 at % $Ce^{3+}$, and curved represents a doping concentration of 0.15 at % $Ce^{3+}$.

In view of the above transmission spectrums, since YAG: $Ce^{3+}$ fluorescent ceramics have a high transmittance in the red wavelength band (usually above 80%), a thickness of the wavelength conversion layer 102 used in the present disclosure is between 1 μm and 500 μm, preferably 200 μm, so that a transmittance of red light is greater than 80%.

Figure 2:
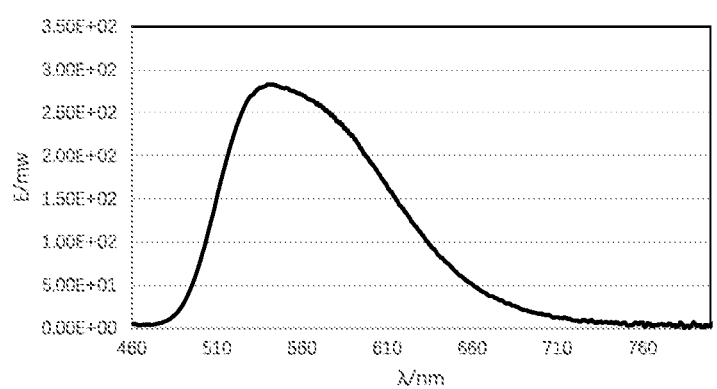
FIG. 2 shows an emission spectrum of a wavelength conversion layer of the laser light source system according to the first embodiment.

In addition, the wavelength conversion layer 102 emits light in a spectral band as shown in FIG. 2 under the excitation of blue excitation light, and a dominant wavelength of the emitted light is around 550 nm.

Angle Selection Filter Film 103

The angle selection filter film 103 determines whether to transmit or reflect the light according to an angle of the light incident on the filter film. The angle selection filter film 103 in the present disclosure allows the red light with an incident angle less than a specific angle to pass through, and reflects the excited light emitted by the wavelength conversion material and red light with an incident angle greater than the specific angle. That is, as long as there is a film layer at the position where the angle selection filter film 103 is to be provided in the present disclosure and the film layer conforms to a case that as the incident angle of the red light increases, the red light gradually changes from being transmitted to being reflected and the film layer always reflects the excited light emitted by the wavelength conversion material, then such a film layer is the angle selective filter film of the present disclosure.

Anyone with a little optical knowledge knows that it is difficult to achieve 100% complete transmission or reflection for a filter or a filter film, and it is not a direct jump from being substantially transmitted to being substantially reflected. Instead, there exists an angular interval from higher transmittance to higher reflectivity. Therefore, the specific angle in this disclosure refers to an incident angel at which the transmittance of the red light is equal to the reflectance of the red light when irradiating the filter film 103 at the incident angle. When the incident angle of the red light is less than the specific angle, the red light is substantially transmitted. When the incident angle of the red light is greater than the specific angle, the red light is substantially reflected. The specific angle may be any angle between 5 and 60 degrees, as long as there is the specific angle existing as a critical value. Preferably, in order to reflect the red light emitted from the red light source side as little as possible and at the same time reflect red light scattered from the wavelength conversion layer side as much as possible, the specific angle is preferably between 5 and 30 degrees.

The angle selection filter film 103 can be formed by, for example, a vacuum evaporation method and can be formed between the wavelength conversion layer 102 and the substrate 104 described later.

For example, the angle selection filter film 103 can be formed on a lower surface of the wavelength conversion layer 102 by the vacuum evaporation method, and then adhered to an upper surface of the substrate 104 with a transparent and heat-resistant adhesive having a good thermal conduction capability. The adhesive is preferably silica gel with a low refractive index, for example, the refractive index is 1.41, but the present disclosure is not limited to this.

In another method of forming the angle selection filter film 103, the angle selection filter film 103 can be formed on an upper surface of the substrate 104 by the vacuum evaporation method, and then a transparent and heat-resistant adhesive having a good thermal conduction capability is used to bond the wavelength conversion layer 102 onto the surface of the angle selection filter film 103. A material of the adhesive is also preferably silica gel with a low refractive index, for example, the refractive index is 1.41.

In yet another method of forming the angle selection filter film 103, the angle selection filter film 103 can be formed on a lower surface of the substrate 104 by the vacuum evaporation method, and a transparent and heat-resistant adhesive having a good thermal conduction capability is used to bond the lower surface of the wavelength conversion layer 102 and the upper surface of the substrate 104. The material of the adhesive is also preferably silica gel with a low refractive index, for example, the refractive index is 1.41.

Figure 4:
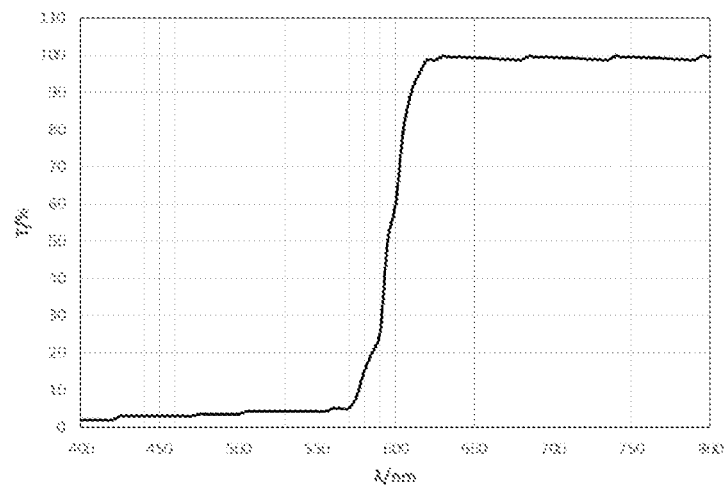
FIG. 4 is a transmittance curve of light in the visible light range through the angle selection filter film 103.

FIG. 4 shows a transmittance curve of light in the visible light range through the angle selection filter film 103. As shown in FIG. 4, light with a wavelength less than 570 nm is reflected, light with a wavelength greater than 620 nm is transmitted, and light with a wavelength between the two wavelengths is partially reflected and partially transmitted.

Substrate 104

The substrate 104 is a colorless and transparent substrate, which is usually made of optical glass, quartz glass or sapphire, and is preferably made of sapphire. The substrate 104 is used as a thermal conduction substrate that conducts heat from the wavelength conversion layer and enables the heat to be quickly dissipated.

<Optical Path Adjustment Component>

In the first embodiment shown in FIG. 1, the optical path adjustment component is composed of a condenser lens 101 and a condenser lens 105. The condenser lens 101 is on an optical path of the blue excitation light L3 and between an excitation light source for emitting blue excitation light and the wavelength conversion device. The condenser lens 105 is on an optical path of the red light L1, and between the wavelength conversion device and the red light source.

The condenser lens 101 is configured to converge the parallel blue excitation light L3 onto the surface of the wavelength conversion layer 102 of the wavelength conversion device, and at the same time collect the following lights:

(1) The blue excitation light L3 that is not absorbed by the surface of the wavelength conversion layer 102 and is reflected back;

(2) Outgoing light L2 from the surface of the wavelength conversion layer 102; and (3) The red light L1 transmitted through the wavelength conversion device.

The material forming the condenser lens 101 may be transparent plastic, glass, sapphire, etc., preferably quartz glass.

The condenser lens 105 is configured to condense the red light L1. Specifically, the condenser lens 105 focuses the light emitted by a single or a plurality of red light sources into a light beam with a small angle. The light beam is incident on the lower surface of the transparent substrate 104, then is transmitted through the substrate 104, the angle selection filter film 103, and the wavelength conversion layer 102 with YAG: Ce3+ as the main material, and then enters the condenser lens 101, so that the red light L1 is combined with the excited outgoing light L2 and the blue excitation light L3.

<Light Source>

In FIG. 1, since L1 represents red light, L2 represents light emitted by the wavelength conversion device, and L3 represents blue excitation light, it can be seen that although it is not shown in FIG. 1, the light source can include two light sources, that is, a red light source and a blue excitation light source.

As shown in FIG. 1, the blue excitation light L3 passes through the condenser lens 101 and irradiates the wavelength conversion layer 102, thereby exciting the wavelength conversion material contained in the wavelength conversion layer 102, so that the wavelength conversion layer 102 emits the excited outgoing light L2. In order to improve efficiency of the excitation light exciting the wavelength conversion layer 102, the blue light source is preferably a blue laser light source, such as a laser or a laser array.

The red light L1 passes through the condenser lens 105 and is incident on the lower surface of the substrate 104 of the wavelength conversion device. When the red light L1 is incident on the angle selection filter film 103, only the red light L1 having a small angle is transmitted through the angle selection filter film 103, and the red light L1 having a large angle is reflected by the angle selection filter film 103. The red light L1 transmitted through the angle selection filter film 103 and the wavelength conversion layer 102 is then combined with the excited outgoing light L2 and the blue excitation light L3.

In the above structures of the present disclosure, a red light source is used in addition to the blue excitation light source, and YAG: $Ce^{3+}$ is used as the main material in the wavelength conversion layer. Therefore, a high transmittance of red light in the wavelength conversion device can be realized, and the problem of insufficient red light in the prior arts can be solved.

In addition, according to the above description of the angle selection filter film 103, the reflection on the red light source side should be reduced as much as possible, while the reflection of the red light on the wavelength conversion layer side should be increased as much as possible. That is, it is required that the incident angle on the red light source side is as small as possible, and the incident angle of the red light on the wavelength conversion layer side is as large as possible. Therefore, it is preferable that the red light source is a red laser light source, such as a red laser or a red laser array. The divergence of a light beam from a laser is small, so that all of the incident angles are relatively small and can meet the requirements of less than a specific angle. Therefore, the light beam is substantially transmitted or even completely transmitted, and the utilization rate of red light is improved. The smaller the specific angle is allowed to be designed, the more the amount of red light reflected on the wavelength conversion layer side will be, thereby further improving the utilization rate of red light.

In addition, in this embodiment, a fixed package is used. That is, positions of the various components are fixed. Therefore, a structure capable of further dissipating heat can be provided around the substrate 104 and on the lower surface of the substrate 104.

In addition, in this embodiment, the blue excitation light source and the red light source are separately controlled by two independent circuit modules. In a single-DMD (digital micromirror device) system, a signal of a circuit system and a signal of an optical path conversion system are synchronized to achieve the effect of emitting red light or enhancing brightness of red light.

In addition, since the red laser light emitted by the red light source is prone to problems such as speckle, the material used to form the wavelength conversion layer 102 in this embodiment is preferably a multiphase ceramic obtained by mixing YAG: $Ce^{3+}$ phosphors and alumina and then sintering. The multiphase ceramic has complex grain boundaries. Through scattering and refraction phenomena at the grain boundaries, polarization characteristics of the red laser light are changed, thereby effectively reducing the speckle problem caused by red light.

Figure 5:
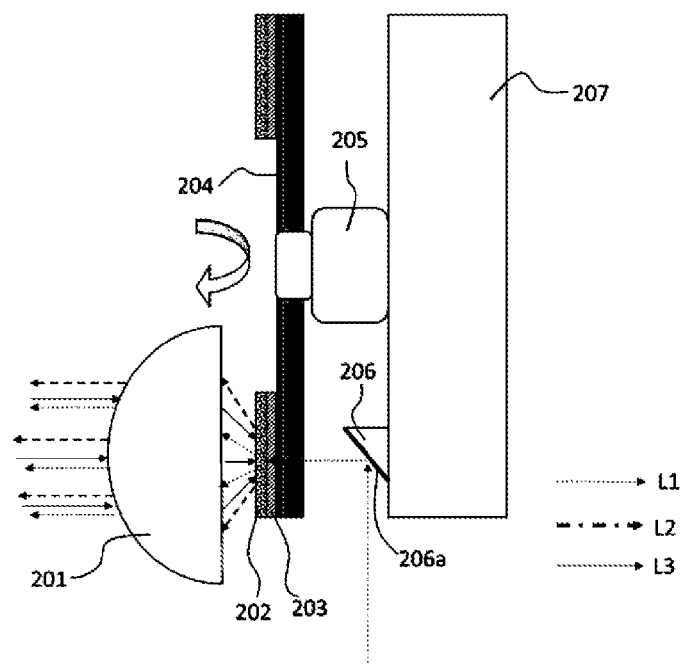
FIG. 5 is a schematic view showing the laser light source system according to a second embodiment of the present disclosure.
Figure 6:
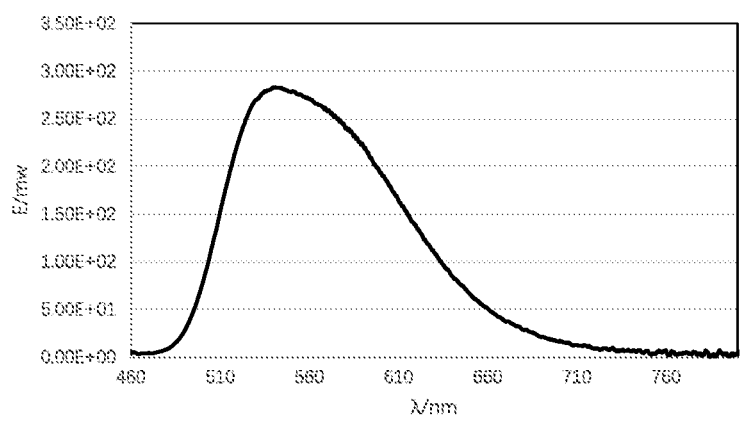
FIG. 6 shows an emission spectrum of a wavelength conversion layer of the laser light source system according to the second embodiment.

FIG. 5 is a schematic view showing the laser light source system according to a second embodiment of the embodiments of the present disclosure. As shown in FIG. 5, the laser light source system according to the second embodiment of the present disclosure also includes a wavelength conversion device, an optical path adjustment component, and a laser light source (not shown).

Compared with the first embodiment, differences of the second embodiment lie in:

1. The optical path adjustment component includes a total reflection mirror 206 that replaces the condenser lens 105 in the first embodiment. The total reflection mirror 206 is on the optical path between the wavelength conversion device and the red light source;

2. The laser light source system further includes a motor 205 and a motor support 207. The motor 205 is configured to rotate the substrate 204 and the wavelength conversion layer 102 and the angle selection filter film 103 provided on the substrate 204. The motor support 207 is formed of a metal, for supporting and fixing the motor.

In the second embodiment, the total reflection mirror 206 is fixed on the motor support 207 and is formed of, for example, a quartz glass material. As shown in FIG. 5, the total reflection mirror 206 has a total reflection surface 206a, so that the light from the red light source is reflected and passes through the wavelength conversion device so as to combine with the outgoing light L2 and the blue excitation light L3.

In another modified embodiment, the total reflection mirror 206 can be formed by arranging the total reflection mirror in such a way that the total reflection mirror is inclined at an angle of 45° away from the red light source. Although the specific arrangement and position of the total reflection mirror 206 are illustrated, this embodiment is only exemplary, and not limited. Therefore, as long as the total reflection mirror 206 is on the red light path and between the wavelength conversion device and the red light source and directs the red light to the wavelength conversion device, it falls within the spirit and scope of the present disclosure.

In addition, in the second embodiment, the wavelength conversion device is rotated by the motor 205, so that heat of the wavelength conversion device can be dissipated through the rotation, which further improves the heat dissipation effect of the wavelength conversion device.

In addition, the condenser lens 201, the wavelength conversion layer 202, the angle selection filter film 203, and the substrate 204 in the second embodiment are the same as the condenser lens 101, the wavelength conversion layer 102, the angle selection filter film 103, and the substrate 104 in the first embodiment in structure and characteristics, so related descriptions are omitted.

Same as described in the first embodiment, the laser light source system of the second embodiment also uses a blue excitation light source, a red light source, and a wavelength conversion layer adopting YAG: $Ce^{3+}$ as a main material. Therefore, additional red light can be added to the outgoing light L2, thereby solving the problem of insufficient red light in the prior arts.

Additionally, in the second embodiment, the blue excitation light source and the red light source are separately controlled by two independent circuit modules. For a projection light source having a single-DMD optical-mechanical system, a signal of the circuit system and a signal of the optical path conversion system can be synchronized to achieve effect of enhancing the brightness of the red light. For a projection light source having the optical-mechanical system with three DMDs, signal synchronization is not required.

In addition, since the red light is prone to problems such as speckle, the fluorescent ceramic used to form the wavelength conversion layer 102 in this embodiment is preferably a multiphase ceramic obtained by mixing YAG: $Ce^{3+}$ phosphors and alumina and then sintering. Through scattering and refraction phenomena at the grain boundaries of the multiphase ceramic and the rotation of the wavelength conversion device, the speckle problem caused by red light can be effectively reduced.

Although the excitation light source is defined as a blue excitation light source in the first and second embodiments of the present disclosure, excitation light sources of other colors may also be used.

From the description of the above exemplary embodiments, it can be seen that the present disclosure provides a wavelength conversion device that additionally uses red light and a wavelength conversion layer with YAG: $Ce^{3+}$ as a main material, and an excitation light source is combined to form a hybrid laser light source system with mixed light sources. The system can effectively solve the problem of insufficient red light in technology for exciting phosphors in prior arts.

Specifically, in the present disclosure, the wavelength conversion layer using YAG: $Ce^{3+}$ material has a transmittance of more than 80% for red light and a red light source is added. By transmitting the red light through the wavelength conversion device, a hybrid light source is realized through combining the red light with the outgoing light of the wavelength conversion device and the blue excitation light, and at the same time, a proportion of red light in the combined light is increased, thereby supplementing the insufficient red light in prior arts.

In addition, although in both first and second embodiments the optical path adjustment component such as lenses and mirrors for guiding blue and red lights to the wavelength conversion device is described, such an optical path adjustment component may not be included in the present disclosure, and the blue and red lights are directly incident on the wavelength conversion device.

It should be understood by those skilled in the art that various modifications, combinations, sub-combinations and changes can be made within the scope of the appended claims of the present disclosure or their equivalents according to design requirements and other factors.

What is claimed is:

1. A light source system, comprising:
    a wavelength conversion layer configured to receive excitation light and generate excited light in response to the excitation light;
    a transparent thermal conduction substrate configured to support the wavelength conversion layer;
    an excitation light source configured to emit the excitation light from a side of the wavelength conversion layer toward the wavelength conversion layer;
    a red light source configured to emit red light from a side of the transparent thermal conduction substrate toward the wavelength conversion layer;
    an angle selection filter film provided between the transparent thermal conduction substrate and the wavelength conversion layer or on a surface of the transparent thermal conduction substrate opposite to the wavelength conversion layer, wherein the angle selection filter film is configured to transmit a portion of the red light which has an incident angle less than a specific angle, and reflect the excited light and a portion of the red light which has an incident angle greater than the specific angle; and,
    a motor configured to rotate the transparent thermal conduction substrate and the wavelength conversion layer on the transparent thermal conduction substrate.

2. The light source system according to claim 1, further comprising an optical path adjustment component, wherein the optical path adjustment component comprises a first condenser lens on an optical path of the excitation light and between the excitation light source and the wavelength conversion layer, and a reflector on an optical path of the red light and between the transparent thermal conduction substrate and the red light source.

3. The light source system according to claim 2, further comprising:
    a motor support configured to support and fix the motor, wherein the reflector is arranged on the motor support.

4. The light source system according to claim 2, wherein the reflector is a total reflection mirror that has a total reflection surface, and the total reflection surface is configured to reflect the red light from the red light source to the wavelength conversion layer.

5. The light source system according to claim 4, wherein the total reflection mirror is formed by arranging the total reflection mirror in such a way that the total reflection mirror is inclined at an angle of 45° away from the red light source.

6. The light source system according to claim 1, further comprising two independent circuit modules, wherein the excitation light source and the red light source are separately controlled by the two independent circuit modules.

7. The light source system according to claim 1, wherein a thickness of the wavelength conversion layer is 200 μm.

8. The light source system according to claim 1, wherein the wavelength conversion layer is formed of one of the following layers: a material layer formed by curing silica gel mixed with YAG: $Ce^{3+}$ phosphor; a fluorescent glass layer formed of YAG: $Ce^{3+}$ phosphor and glass; a pure phase ceramic layer of YAG: $Ce^{3+}$; and a multiphase ceramic layer formed by sintering YAG: $Ce^{3+}$ mixed with alumina material.

9. The light source system according to claim 1, wherein the wavelength conversion layer has a transmittance greater than 80% for the red light.

10. The light source system according to claim 1, wherein the specific angle is between 5 and 60 degrees.

11. The light source system according to claim 1, wherein the specific angle is between 5 and 30 degrees.

12. The light source system according to claim 1, further comprising a first condenser lens on an optical path of the excitation light and between the excitation light source and the wavelength conversion layer, wherein the first condenser lens is configured to converge the excitation light onto the wavelength conversion layer, and simultaneously collect a portion of the excitation light which is not absorbed by the wavelength conversion layer and is reflected back, the excited light emitted from the wavelength conversion layer, and a portion of the red light which is transmitted through the wavelength conversion layer.

13. The light source system according to claim 2, wherein the first condenser lens is configured to converge the excitation light onto the wavelength conversion layer, and simultaneously collect a portion of the excitation light which is not absorbed by the wavelength conversion layer and is reflected back, the excited light emitted from the wavelength conversion layer, and a portion of the red light which is transmitted through the wavelength conversion layer.

14. The light source system according to claim 1, wherein a main material in the wavelength conversion layer is YAG: $Ce^{3+}$.

15. The light source system according to claim 1, wherein a thickness of the wavelength conversion layer is between 1 μm and 500 μm.

16. The light source system according to claim 1, wherein the angle selection filter film is formed on a lower surface of the wavelength conversion layer close to the transparent thermal conduction substrate, or formed on an upper surface of the transparent thermal conduction substrate close to the wavelength conversion layer, or formed on a lower surface of the transparent thermal conduction substrate.

17. The light source system according to claim 1, further comprising an optical path adjustment component, wherein the optical path adjustment component comprises a first condenser lens, and a second condenser lens, the first condenser lens is on an optical path of the excitation light and between the excitation light source and the wavelength conversion layer, and the second condenser lens is on an optical path of the red light and between the transparent thermal conduction substrate and the red light source.

* * * * *